US008201083B2

(12) United States Patent
Kostoulas et al.

(10) Patent No.: US 8,201,083 B2
(45) Date of Patent: *Jun. 12, 2012

(54) SIMPLE ONE-PASS W3C XML SCHEMA SIMPLE TYPE PARSING, VALIDATION, AND DESERIALIZATION SYSTEM

(75) Inventors: Margaret Gatatzes Kostoulas, Belmont, MA (US); Moshe E. Matsa, Cambridge, MA (US); Eric Perkins, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 1022 days.

This patent is subject to a terminal disclaimer.

(21) Appl. No.: 12/130,161

(22) Filed: May 30, 2008

(65) Prior Publication Data

US 2008/0229188 A1 Sep. 18, 2008

Related U.S. Application Data

(63) Continuation of application No. 11/460,047, filed on Jul. 26, 2006, now abandoned.

(51) Int. Cl.
*G06F 17/00* (2006.01)
(52) U.S. Cl. ........................................................ 715/237
(58) Field of Classification Search .................. 715/237, 715/234; 717/143
See application file for complete search history.

(56) References Cited

OTHER PUBLICATIONS

Liquid XML Data Binding Wizard 3,White Paper 3.0, Liquid Technologies, Oct. 1, 2003, http://web.archive.org/web/20040102193758/http://www.liquid-technologies.com/Products/XmlDataBinding/LT_XDB_WhitePaper.pdf.*
M. G. Kostoulas, M. Matsa, N. Mendelsohn, E. Perkins, and A. Heifets, "XML screamer: An integrated approach to high performance XML parsing, validation and deserialization," in In 15th International World Wide Web Conference, 2006, pp. 93-102.*
Y.M.Gopala Krishna Reddy , Simplifying Serialization and De-serialization Processes With XSD.EXE, Jan. 30, 2006 http://www.codeproject.com/KB/XML/Serialization.aspx.*
Chiu, K. and Lu, W. A compiler-based approach to schema specific XML parsing. In First International Workshop on High Performance XML Processing (May 2004).*
Validation of XML with Schemas,MSDN, Retrieved Aug. 18, 2001 http://msdn.microsoft.com/en-us/library/aa310911%28VS. 71,printer%29.aspx.*

(Continued)

*Primary Examiner* — Adam M Queler
(74) *Attorney, Agent, or Firm* — Cantor Colburn LLP; Derek Jennings

(57) ABSTRACT

A method for validating simple type data in XML documents, the method comprising: identifying data via an Extensible Markup Language (XML); developing schema for specifying formal data typing and validation of element content in terms of data types; generating a parser for parsing the collection of elements in a first stage where the schema is read and modeled in terms of abstract schema components, a second stage where the schema is augmented with a set of calculated schema components and properties used to drive code generation, and a third stage where the schema is traversed to generate a validation code for each of the collection of elements, and generate simple type validator modules which perform well-formedness checking the data; validating the simple type data against specific type information; and converting the data to datatype-specific form, all in a single pass.

3 Claims, 5 Drawing Sheets

OTHER PUBLICATIONS

Robert A. Van Engelen and Kyle A. Gallivan. 2002. The gSOAP Toolkit for Web Services and Peer-to-Peer Computing Networks. In Proceedings of the 2nd IEEE/ACM International Symposium on Cluster Computing and the Grid (CCGRID '02). IEEE Computer Society, Washington, DC, USA, 128-.*

Löwe, W.M., Noga, M.L., and Gaul, T.S. Foundations of Fast Communication via XML. Annals of Software Engineering, 13 (Jun. 2002), 357-359.*

Priya Lakshminarayanan, "how do i validate and deserialise xml?" MSDN Forums, Reply #1, Jan. 30, 2006 http://social.msdn.microsoft.com/Forums/en-US/xmlandnetfx/thread/cf4b1f76-1eaa-4d2d-abee-996436303c4e/.*

IBM Systems Journal, vol. 45, No. 2, 2006, "Generation of efficient parsers through direct compilation of XML Schema grammars," E. Perkins, M. Matsa, M.G. Kostoulas, A. Heifets, and N. Mendelsohn. pp. 1-20.

* cited by examiner

```
<shipTo country="US">
    <name>Alice Smith</name>
    <street>123 Maple Street</street>
    <city>Mill Valley</city>
    <state>CA</state>
    <zip>90952</zip>
</shipTo>
``` which conforms to the following schema

```
<xsd:element name="shipTo" type="USAddress"/>

<xsd:complexType name="USAddress">
    <xsd:sequence>
        <xsd:element name="name" type="xsd:string"/>
        <xsd:element name="street" type="xsd:string"/>
        <xsd:element name="city" type="xsd:string"/>
        <xsd:element name="state" type="xsd:string"/>
        <xsd:element name="zip" type="xsd:decimal"/>
    </xsd:sequence>
    <xsd:attribute name="country" type="xsd:NMTOKEN" fixed="US" />
</xsd:complexType>
```

*FIG. 1*

```
<shipTo country="US">
    <name>Alice Smith</name>
    <street>123 Maple<!-- this comment is not expected by the specialized
STV module,
since it was written to handle strings without comments in them -->
Street</street>
    <city>Mill Valley</city>
    <state>CA</state>
    <zip>90952</zip>
</shipTo>
```

*FIG. 2*

SIMPLE ONE-PASS W3C XML SCHEMA SIMPLE TYPE PARSING, VALIDATION, AND DESERIALIZATION SYSTEM

CROSS-REFERENCE TO RELATED APPLICATION

This application is a continuation of U.S. patent application Ser. No. 11/460,047, filed Jul. 26, 2006. The disclosure of the above application is incorporated herein by reference.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to XML parsers, and particularly to a method for performing simple-type well-formedness checking, validation, and datatype conversion in one single pass.

2. Description of Background

XML (Extensible Markup Language) has begun to work its way into the business computing infrastructure and underlying protocols such as the Simple Object Access Protocol (SOAP) and Web services. In the performance-critical setting of business computing, however, the flexibility of XML becomes a liability due to the potentially significant performance penalty. XML processing is conceptually a multitiered task, an attribute it inherits from the multiple layers of specifications that govern its use including: XML, XML namespaces, XML Information Set (Infoset), and XML Schema. Traditional XML processor implementations reflect these specification layers directly. Bytes, read off the "wire" or from disk, are converted to some known form. Attribute values and end-of-line sequences are normalized. Namespace declarations and prefixes are resolved, and the tokens are then transformed into some representation of the document Infoset. The Infoset is optionally checked against an XML Schema grammar (XML schema, schema) for validity and rendered to the user through some interface, such as Simple API for XML (SAX) or Document Object Model (DOM) (API stands for application programming interface).

With the widespread adoption of SOAP and Web services, XML-based processing, and parsing of XML documents in particular, is becoming a performance-critical aspect of business computing. In such scenarios, XML is invariably constrained by an XML Schema grammar, which can be used during parsing to improve performance. Although traditional grammar-based parser generation techniques could be applied to the XML Schema grammar, the expressiveness of XML Schema does not lend itself well to the generic intermediate representations associated with these approaches.

Indeed, for parsing in domains other than XML (e.g., programming languages), grammars have long been used to generate optimized special purpose parsers that operate much more efficiently than their generic counterparts, while performing validation checking. The XML specifications were designed to enable the compilation of an XML Schema grammar to a special-purpose parser. However, generic XML parsers, by performing tasks in separate passes, degrade performance of the overall application.

In particular, in validating XML data against XML Schema simple types, it is common practice to scan the document for syntactic constructs such as angle brackets, quotes, entity references etc., before validating the scanned data against the simple type production. When deserialization of the data into datatype-specific objects is also needed, typical applications reparse the input data to perform the conversion, thus resulting in poor performance. Traditional XML parsers that validate against W3C XML Schema simple types do so by first well-formedness checking the data, then validating it against the specific type, and then converting it to a datatype-specific form. In other words, there are multiple passes. In many cases, the upconverted but otherwise raw data is then passed to an application, which reconverts it to application-specific form. These extra passes take much time and thus considerably slow down the parse processing.

Traditional XML parsers are not capable of performing all necessary tasks in a single pass. Thus, it is desired to design and implement an XML parser that can perform well-formedness checking, validation, and datatype conversion for simple types in one single pass.

SUMMARY OF THE INVENTION

The shortcomings of the prior art are overcome and additional advantages are provided through the provision of a method for validating simple type data in XML documents, the method comprising: identifying data via an Extensible Markup Language (XML); defining a tag set; developing schema for specifying formal data typing and validation of element content in terms of data types; generating a validating parser for parsing the collection of elements given the schema information; the parser is generated in three stages, the first stage being where the schema is read in and modeled in terms of abstract schema components, a second stage where the schema is augmented with a set of calculated schema components and properties used to drive code generation, and a third stage where the schema is traversed to generate a validation code for each of the collection of elements; and generating simple type validator modules which do well-formedness checking of the data; validating the data against specific type data; and converting the data to datatype-specific form; wherein the well-formedness checking step, the validating step, and the datatype conversion step (deserialization) occur in a single pass.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution that performs well-formedness checking, validation, and datatype conversion of simple types in one single pass by generating specialized simple type validator modules.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates an example of an XML document and the XML Schema it conforms to;

FIG. 2 illustrates an example XML document that causes the optimistic generated simple type validator to return with a provisional failure code due to the comment embedded in the character data;

DETAILED DESCRIPTION OF THE INVENTION

Figure 3:
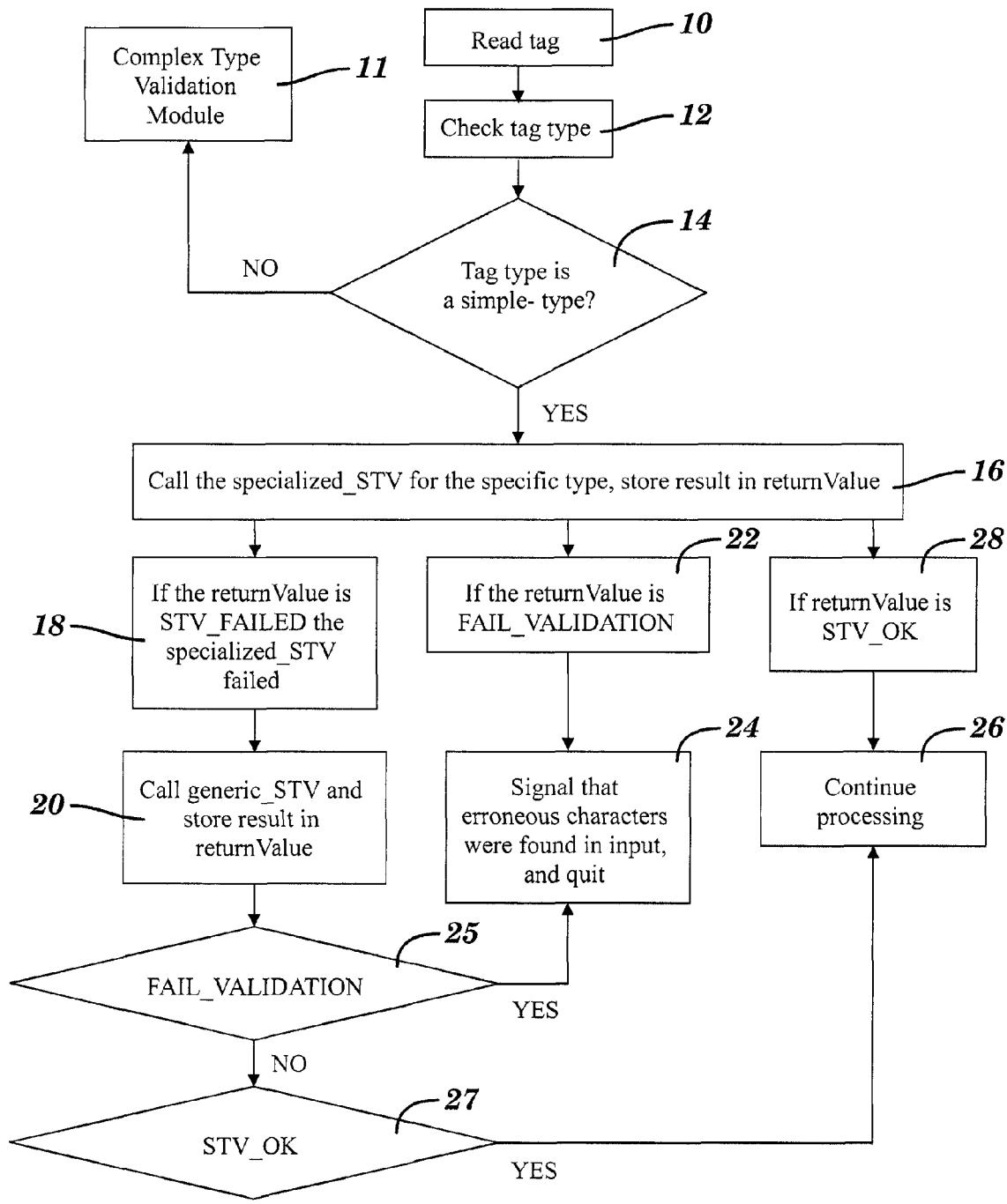
FIG. 3 illustrates one example of a flowchart describing the operation of a generated XML parser.

One aspect of the exemplary embodiments is a method for generating specialized simple type validator modules. Another aspect of the exemplary embodiments is an XML parser that performs all its simple-type processing tasks in a single pass.

XML is an Extensible Markup Language. It improves the functionality of the Web by allowing a user to identify information in a more accurate, flexible, and adaptable way. It is extensible because it is not a fixed format like HTML, which is a single, predefined markup language. Instead, XML is actually a meta-language, that is, a language for describing other languages that allows a user to design his/her own markup languages for limitless different types of documents.

The purpose of a schema is to define a class of XML documents, and so the term "instance document" is often used to describe an XML document that conforms to a particular schema. In fact, neither instances nor schemas need to exist as documents per se. They may exist as streams of bytes sent between applications, as fields in a database record, or as collections of XML Infoset "Information Items." Also, developing schema requires specifying formal data typing and validation of element content in terms of data types.

In XML Schema, there is a basic difference between complex types, which allow elements in their content and may carry attributes, and simple types, which cannot have element content and cannot carry attributes. There is also a major distinction between definitions, which create new types (both simple and complex), and declarations, which enable elements and attributes with specific names and types (both simple and complex) to appear in document instances.

New complex types are defined using the 'complex type' element and such definitions typically contain a set of element declarations, element references, and attribute declarations. The declarations are not themselves types, but rather an association between a name and the constraints, which govern the appearance of that name in documents, governed by the associated schema. Elements are declared using the 'element' element, and attributes are declared using the 'attribute' element.

Like the Document Type Definition (DTD) grammar used in XML, XML Schema can specify an element's content model as a regular expression over its contained element. In contrast to the grammars that can be specified with an XML DTD, however, XML Schema supports a wider range of operators in the composition of content models.

A tag set is defined locally within the schema. However, the structure of an XML document constrained by a schema cannot be decomposed below the tag level. Because meta-markup (such as XML namespace declarations and xsi:type declarations) is contained in conceptually unordered attributes, no conclusive information about the document can be inferred until the entire tag is read. Thus, no exchange of information between the scanner and the validation logic can be made to refine the scanning of the rest of the tag without possibly having to back up and correct mistaken assumptions. As a result, the grammar cannot direct scan at a granularity any finer than the tag. Accordingly, the generated validation logic may be separated from the scanning infrastructure, at the tag level, without loss of any significant performance opportunity. Thus, the generated parser is divided into two logical layers, scanning and validation.

The exemplary embodiments of the present application illustrate a system in which customized high performance XML parsers are prepared using parser generation and compilation techniques. Parsing is integrated with Schema-based validation and deserialization, and the resulting validating processors have been shown to be as fast as or in many cases significantly faster than traditional non-validating parsers. High performance is achieved by integration across layers of software that are traditionally separate, by avoiding unnecessary data copying and transformation, and by careful attention to detail in the generated code.

The prior knowledge, from the schema that the data is required to conform to, is used to generate specialized simple type validator modules, as part of the generated XML parser, that perform validation of the simple types during the parsing phase. When deserialization of the simple type data into business objects is also desirable, the conversion to a datatype-specific form is itself integrated into the parsing phase of the generated validator module. This avoids the need for multiple passes on the character data, and results in increased performance of the overall application.

In particular, XML documents are composed of markup and content. There are six kinds of markup that can occur in an XML document: elements, entity references, comments, processing instructions, CDATA sections, and document type declarations.

Elements are the most common form of markup. Delimited by angle brackets, most elements identify the nature of the content they surround. Some elements may be empty, in which case they have no content. If an element is not empty, it begins with a start-tag, <element>, and ends with an end-tag, </element>. If an element is empty, it can be represented with a self-closing start-tag, <element />. Attributes are name-value pairs that occur inside start-tags after the element name. In order to introduce markup into a document, some characters have been reserved to identify the start of markup. The left angle bracket, <, for instance, identifies the beginning of an element start- or end-tag. In order to insert these characters into a document as content, there must be an alternative way to represent them. In XML, entities and character references are used to represent these special characters.

XML-based technology uses a technique called data serialization/deserialization to transform data from one language or application environment into another. In essence, XML-based technology allows any application to take data it is using and serialize that into an XML document instance. This XML data can then be transferred over the network, or stored in a file or database. XML-based technology supports both simple and complex data structures, such as strings, numbers, boolean values, and dates and times, as well as multi-dimensional arrays, associative arrays, and tabular data record sets. XML serialization is a great way for applications to maintain state, read, and write configuration files, and transfer data between processes, applications, and enterprises over a network, including the Internet. Because XML documents are text-based, a user can view and modify serialized data with a text editor.

In the exemplary embodiments of the present application, the XML parser does all necessary work in a single pass. In other words, it performs the well-formedness check through the simple type data while validating the simple type data, and converting simple type data in the same pass. The datatype-specific form can then have facets checked against the simple type definition and can be passed directly to the application.

When validating the simple type content of a tag, a general purpose parser checks every character to determine if it is a special XML character introducing a comment, processing instruction, entity declaration, etc. and processes the following characters accordingly. If no special character is found, the simple type content is processed and when the matching close tag is found, the simple type data will be checked to make sure it is valid for the specified simple type (e.g., only integers for an integer typed tag). Checking each character to see if it is one of those "special" characters is expensive, and since most of the time those special characters are not found in the data content of a tag which is of simple type (e.g. boolean, integer etc.), the generated validating parser of the exemplary embodiments makes the optimistic assumption that no special characters appear in the content of simple types, and proceeds to validate the data contents of a tag, given that assumption.

When the optimism in the validating algorithm fails, character data is required to be revisited and revalidated. Because this path is followed much less often than the optimistic path, the overall parsing, validation, and deserialization of simple type data is much faster than in other existing XML parsers.

In the exemplary embodiments, the XML parser includes two types of validators: the generic_STV, and the specialized_ STV. The specialized_STV processes the characters assuming that no "unexpected" characters are found in the content (i.e., no comments, processing instructions (PIs), entities, or character data sections (CDATA)). Comments, PIs, entities, and CDATA sections are expected in the middle of simple type fields, and the specialized STV does not perform the extra work of processing these unexpected (but legal) items in the input. In the event that the specialized validator fails because the input contained one or more such "unexpected" items, processing falls back to the generic_ STV which handles all legal content but may require several passes over the input to achieve a complete validation.

The specialized_STV validates that every character found in the content is indeed legal at this point (i.e., only Arabic digits for the SimpleTypeValidator_XSD_INT), but does not necessarily check against all characters that would be considered legal at this point: for example, the SimpleTypeValidator_XSD_POSITIVEINTEGER might not expect to find a "+" at the beginning of the input, even though it is legal. In this case, the XML parser provides a "STV_FAILED" output, and the generic non-optimistic simple type validator (generic_ STV) is invoked to validate the input. The set of characters that the specialized_STV checks for are the ones most commonly appearing in the input data, with the goal of maximizing the specialized STV's performance.

When parsing, for example, the XML instance document illustrated in FIG. 1, a generic XML parser and validator will parse the input simple type data and only validate it when it gets to the matching close tag. After making sure the data is valid, facets are checked against the given simple-type facets. As a third step, the data will either be converted to a datatype specific data structure or will be reported as an event stream, in a string format. If the application needs the data as an Integer instead, it converts the integer or string data to an Integer data structure. In contrast, with our generated parser, the generated USAddressValidator uses the specialized SimpleTypeValidator_XSD_STRING module to process the contents of the <name>, <street>, <city> and <state> elements, and the SimpleTypeValidator_XSD_DECIMAL module to process the contents of the <zip> element. These simple type validator modules make optimistic assumptions about the format of the data, and use configuration information about the data structure needed by the application, so the conversion to an Integer object occurs during the parse. Assumptions about the format of the data may include: integer content does not start with leading zeros or a plus sign, there are no comments or CDATA sections embedded in the string or integer data, etc.

However, if the data found in the instance document do not conform to the assumed format, the specialized module falls back to a more generic validator that will reparse the input stream. FIG. 2 illustrates such an example. In FIG. 2, the SimpleTypeValidator_XSD_STRING parses the contents of the <name> tag successfully. It then is invoked again by the USAddressValidator to parse the contents of the <street> tag. It parses successfully the characters '1', '2', '3', ' ', 'M', 'a', 'p', 'l', 'e'. When it sees the "<" character it expects a "/" character to follow, signifying a close-tag, so when it sees the "!" instead it fails, with a failure code that signifies that the input might be valid XML but was not recognized by the specialized validator. Control is then passed to a more generic content model validator to parse the content of the <street> tag from the beginning. The generic validator module revalidates the input data, while allowing for all types of data allowed by the XML 1.0 specification, including comments, CDATA sections, etc. Once the tag has been parsed, and any CDATA sections, or entity references have been resolved, and collated into a contiguous, unescaped sequence of characters, the data can be validated in a straightforward manner against the full definition for the relevant simple type. The need to resolve and collate entities and CDATA sections in the general case requires a lot of processing. Clearly, this is significantly slower than the optimistic validator. Avoiding the use of the generic validator module for common cases results in significantly faster processing time overall.

Similarly, given the following input <zip>90a952</zip> the SimpleTypeValidator_XSD_DECIMAL will successfully process "9" and "0" but will fail when it sees the "a." In this case a different failure code is returned to the USAddressValidator, signifying that erroneous input was found in the input stream, and is definitively not valid with respect to the relevant simple type. In this case, a more generic validator will not be invoked, as the failure was a result of erroneous XML input, and not due to the inability of the specialized validator to process the data.

If during processing, one of these unexpected characters is found, the specialized_STV quits processing the data and indicates either an error code that signifies that this was one of the special characters (indicating that the input is provisionally invalid), or a different error code for an obviously illegal character (e.g., an "a" in the middle of integer content), indicating that the input is definitively invalid. Based on the error code, the parser either (i) quits processing and reports an error in the case of definitively invalid input or (ii) invokes the generic_STV to parse the character data. The generic_STV starts looking at the data from the beginning, so in the case that "special" characters appear often in the character data, the cost of invoking two validators for every character data section is incurred, which can become expensive. In practice, however, the use of these unexpected constructs in simple data is rare. In the world of Web Services in particular, where the XML data is typically generated by applications, no "special" content is expected.

The exemplary embodiments of the present invention generate a specialized_STV for every type of simple data contents that is expected to be in the input stream (information about what types of simple data contents are expected comes from the input schema). So the SimpleTypeValidator_XSD_INTEGER is only required to check if everything in the input stream is integer data, whereas the SimpleTypeValidator_XSD_DATE has to check if what is in the input stream conforms to the XML Schema's specification of a valid date.

Referring to FIG. 3, one example of a flowchart describing the operation of a generated parser is illustrated. In step 10, the process reads a tag. In step 12, the tag type is checked. In step 14, it is decided whether the tag type is a simple type. The determination of which tags are simple types in which contexts can be made entirely at compile time, and looking up the compile-time computed result for the tag type found in step 12, in the current context, can be done quickly at runtime for the generated parser, in step 14. If the tag type is not a simple type, the process flows to a complex type validator module (11). If the tag type is a simple type then the process flows to step 16. In step 16, the specialized_STV is called and the result is stored in returnValue. If the return Value is FAIL_VALIDATION (step 22), control flows to step 24 where it is determined that erroneous characters were encountered and the process flow is terminated. If the returnValue is STV_OK (step 28), the specialized_STV succeeded in validating the data and control is passed to state 26. In step 18, if the returnValue is STV_FAILED, the specialized_STV failed, and the process then flows to step 20, where the generic_STV is called to reparse the input. The return value is stored in returnValue, and again this must be checked to determine if FAIL_VALIDATION (step 25) occurred, or STV_OK (step 27). From step 25, control flows to step 24 where the process flow is terminated. From step 27, control flows to step 26 where we continue processing the input, having successfully validated the current simple data type contents.

Figure 4:
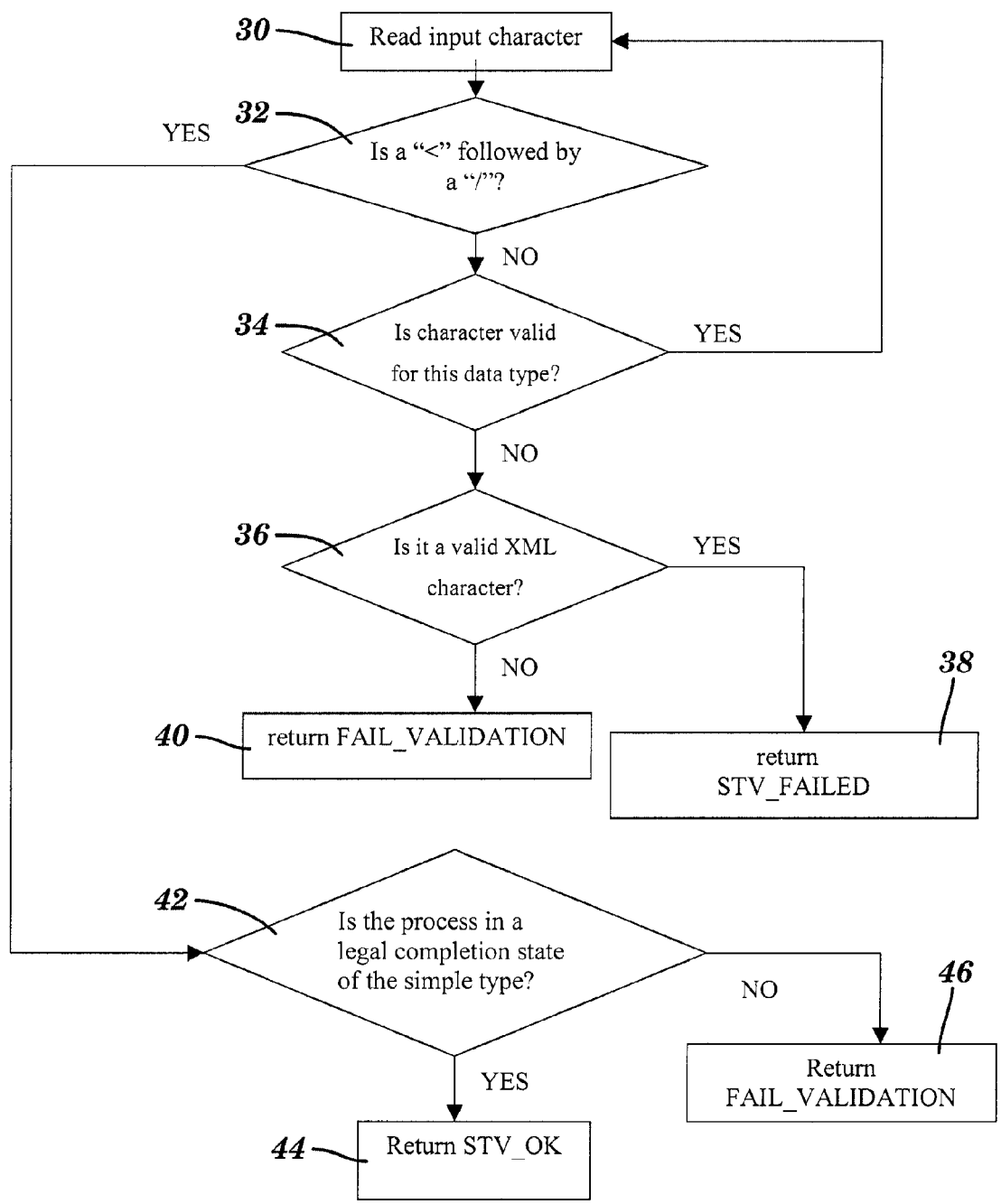
FIG. 4 illustrates one example of a flowchart describing the operation of a specialized simple type validator.

Referring to FIG. 4, one example of a flowchart describing the operation of an optimized_STV is illustrated. In step 30, the input character is read. In step 32, it is determined if the input character was an "<" followed by a "/". If so, the process flows to step 42, if not if flows to step 34. In step 42, it is determined if the current data as seen represents an entire good string of the datatype that is being validated. If so, the process flows to step 44 and returns STV_OK. If not, the process flows to step 46 and returns FAIL_VALIDATION. If the input is not a "<" character followed by a "/" character, then in step 34, it is determined whether the input character is valid for this simple type data at this point in the input string. If the input character is valid, the process flows back to step 30. If the input character is invalid, then the process flows to step 36. In step 36, it is determined whether the character is a valid XML character. If the character is not a valid XML character then the process flows to step 40 where FAIL_VALIDATION is returned. If the character is a valid XML character then the process flows to step 38 where STV_FAILED is returned.

Figure 5:
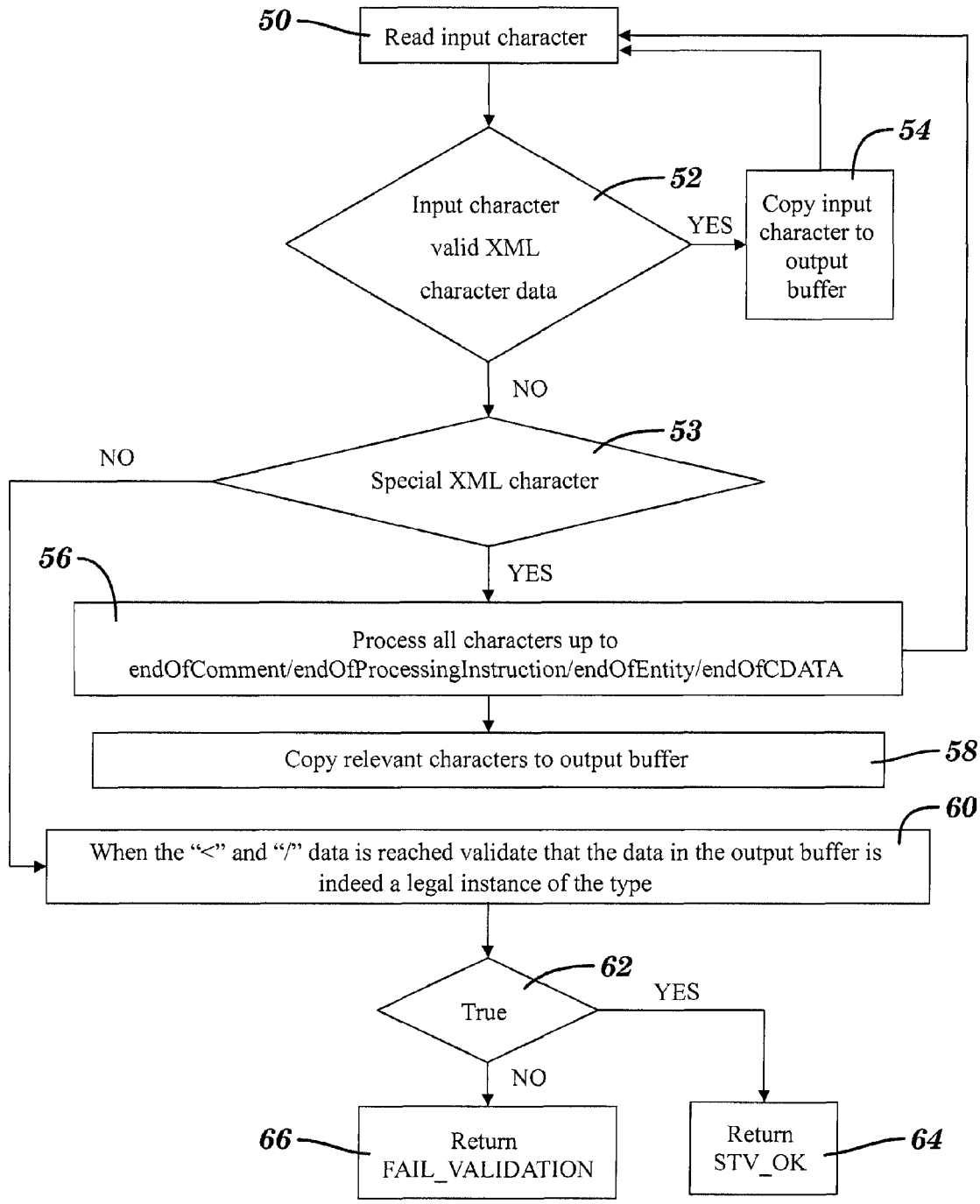
FIG. 5 illustrates one example of a flowchart describing the operation of the generic simple type validator.

Referring to FIG. 5, one example of a flowchart describing the operation of a generic_STV is illustrated. In step 50, the input character is read. In step 52, it is determined whether the input character is a valid XML character. If the input character is a valid XML data character then the input character is copied to an output buffer 54 and the process flow continues at step 50. If the input character is not a valid XML data character then if it is a "special" XML character 53 (i.e., one of the "special" characters that indicate the beginning of a comment, PI, entity, etc.) all characters up to endOfComment/endOfProcessingInstruction/endOfEntity/endOfCDATA are processed. In step 58, the relevant characters are copied to the output buffer, and control flows to step 50. Otherwise, in step 60, when the "<" and "/" data is reached the process validates that the data in the output buffer is indeed a legal instance of the type. In step 62, if the validation is true, then the process flows to step 64 where STV_OK is returned. In step 62, if the validation is not true, then the process flows to step 66 where FAIL_VALIDATION is returned.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for validating simple type data in XML documents, the method comprising:
performing on a computer:
identifying data via an Extensible Markup Language (XML);
defining a tag set by developing schema for specifying formal data typing and validation of element content in terms of data types;
generating a parser for parsing the collection of elements in a first stage where the schema is read and modeled in terms of abstract schema components, a second stage where the schema is augmented with a set of calculated schema components and properties used to drive code generation, and a third stage where the schema is traversed to generate a validation code for each of the collection of elements, to generate simple type validator modules which perform:
well-formedness checking the data;
validating the data against specific type data; and
converting the data to datatype-specific form data;
wherein the well-formedness checking step, the validating step, and the converting step occur in a single pass, and
to generate a type-specific validator module which perform:
checking for a common case;

wherein in cases that common-case checking fails, character content is revisited and revalidated against a full set of valid input for a given type.

2. The method of claim 1, wherein the schema for the data are defined with XML Schema.

3. The method of claim 1, wherein the parser uses one or more simple types defined in the schema and for each simple type a separate type-specific validator is generated.

* * * * *